(12) United States Patent
Hangsleben

(10) Patent No.: US 12,348,965 B2
(45) Date of Patent: Jul. 1, 2025

(54) INMATE INFORMATION COMMUNICATION SYSTEMS

(71) Applicant: Dave W. Hangsleben, Sioux Falls, SD (US)

(72) Inventor: Dave W. Hangsleben, Sioux Falls, SD (US)

(73) Assignee: Hank Technology LLC, Sioux Falls, SD (US)

( * ) Notice: Subject to any disclaimer, the term of this patent is extended or adjusted under 35 U.S.C. 154(b) by 618 days.

(21) Appl. No.: 17/668,679

(22) Filed: Feb. 10, 2022

(65) Prior Publication Data

US 2022/0256345 A1    Aug. 11, 2022

Related U.S. Application Data

(60) Provisional application No. 63/148,411, filed on Feb. 11, 2021.

(51) Int. Cl.
| | | |
|---|---|---|
| *H04W 12/08* | (2021.01) | |
| *H04M 3/22* | (2006.01) | |
| *H04M 3/42* | (2006.01) | |
| *H04M 3/53* | (2006.01) | |
| *H04W 12/63* | (2021.01) | |

(52) U.S. Cl.
CPC ......... *H04W 12/08* (2013.01); *H04M 3/2281* (2013.01); *H04M 3/42221* (2013.01); *H04M 3/5307* (2013.01); *H04W 12/63* (2021.01)

(58) Field of Classification Search
CPC .... H04M 3/38; H04M 1/72448; H04W 48/02
See application file for complete search history.

(56) References Cited

U.S. PATENT DOCUMENTS

| | | | |
|---|---|---|---|
| 8,295,864 B2 | 10/2012 | Samaha | |
| 9,609,101 B1* | 3/2017 | Chen | ..................... H04M 1/185 |
| 11,423,798 B1* | 8/2022 | Marvin | ................. G09B 5/065 |
| 2013/0097676 A1* | 4/2013 | Klassen | ................ G06F 21/305 |
| | | | 726/4 |
| 2016/0373382 A1 | 12/2016 | Reed | |
| 2018/0167774 A1* | 6/2018 | Hodge | ................ H04W 12/122 |

FOREIGN PATENT DOCUMENTS

EP         2869254 A1 *   5/2015   ............. G06Q 20/20

* cited by examiner

*Primary Examiner* — Kevin Kim
(74) *Attorney, Agent, or Firm* — Seager, Tufte & Wickhem, LLP

(57) ABSTRACT

A penal facility communication system can include wireless devices configured to permit wireless communication within a penal facility between a first subset of the wireless devices configured as wireless management devices and a second subset of the wireless devices configured as wireless inmate devices.

18 Claims, 7 Drawing Sheets

INMATE INFORMATION COMMUNICATION SYSTEMS

CROSS-REFERENCE TO RELATED APPLICATIONS

This application claims priority to U.S. Provisional Application 63/148,411 filed Feb. 11, 2021, the entire contents of which is incorporated by reference.

BACKGROUND

Inmates housed in penal institutions such as incarceration and/or correctional facilities can be permitted to communicate with friends, family, and/or others. For example, a family member can communicate with an inmate housed in penal institution while the family member is physically present at the penal institution and/or while the family member is remotely located from the penal institution. Such communications may have various security considerations, logistical considerations, and/or privacy considerations, among other considerations associated therewith.

DETAILED DESCRIPTION

Figure 1:
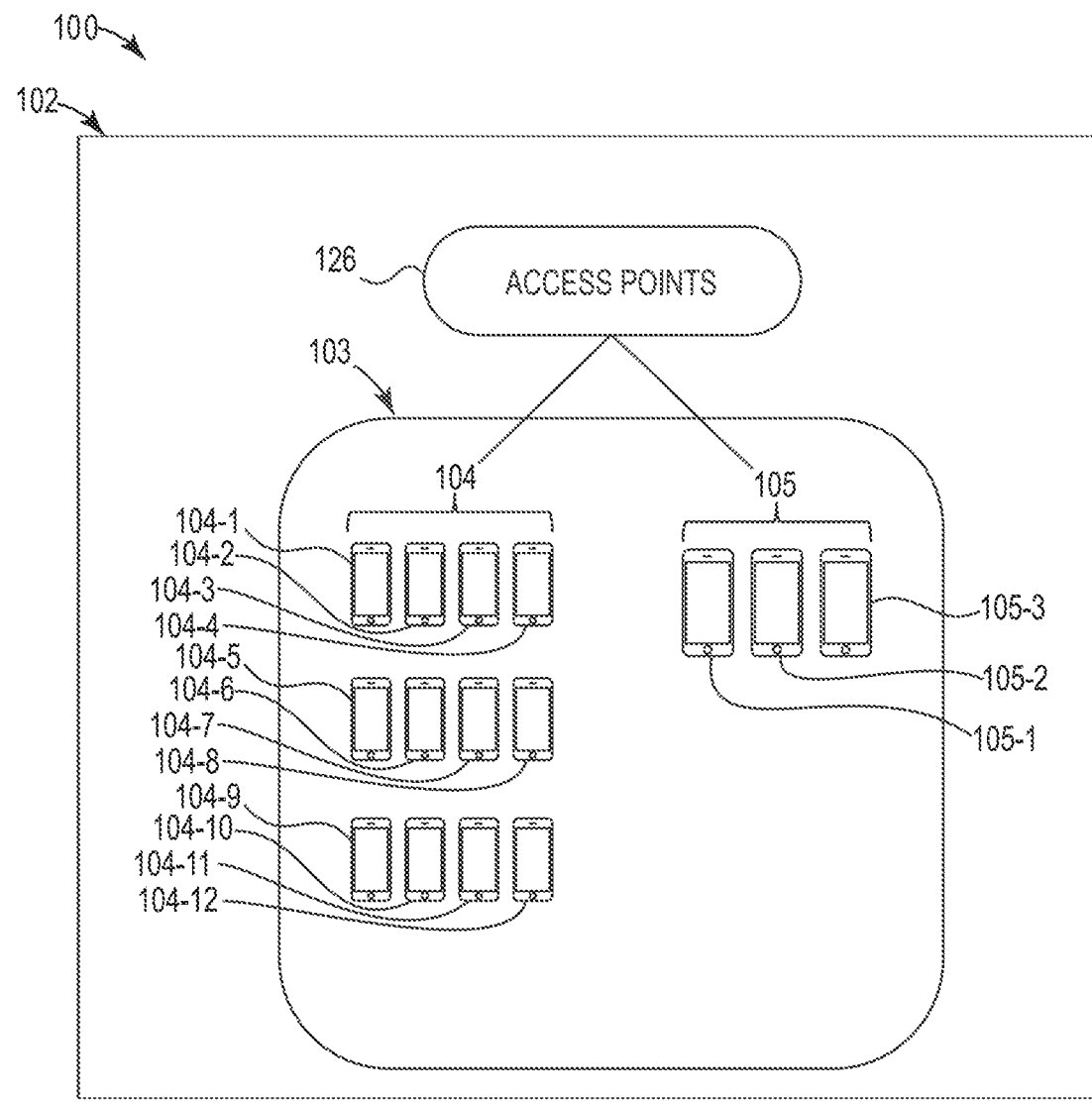
FIG. 1 illustrates an example of an inmate information communication system consistent with the disclosure.

Penal institutions such as incarceration facilities and correctional facilities refer to locations (e.g., prisons and/or jails) that house inmates. An inmate refers to an incarcerated person, for instance, those in a penal facility or other type of penal institution.

Penal institutions can permit communication between inmates and customers. As used herein, a customer can refer to a family member, significant other, friend, and/or legal representative of an inmate that communicates with an inmate, among other customers that may communicate with the inmate. Such communications can occur in person when a customer visits an inmate at a penal institution or can occur remotely via telephone, electronic mail (email), or other mechanisms.

Allowing communication between inmates and customers can be desirable for penal institutions. For instance, allowing communication between an inmate and a customer may promote good behavior by the inmate from the perspective of the penal facility. However, allowing an inmate to communicate with customers in some circumstances may be detrimental, such as when an inmate may be furthering criminal activity by communicating with a customer. Thus, it can be desirable to provide an inmate with a way to communicate with customers while discouraging criminal activity. For instance, providing inmates access to telephones and/or electronic mail can allow an inmate to communicate with a customer while allowing, when legally permissible, penal facility staff, law enforcement, and/or legal counsel, among others, to monitor, record, and/or review those communications. However, inmate access to these methods of communication may be limited, for instance, by time, as other inmates may be waiting to use telephones or email. Further, an inmate may not have their desired level of privacy as other inmates may be waiting in proximity to use telephones or email.

Additionally, it can be desirable to permit direct communication between various penal facility staff (e.g., officers, doctors, mental health professionals, librarians, custodians, etc.) and inmate. However, direct in-person communications between inmates and penal staff can be difficult to schedule and/or safely conduct.

Moreover, it can be desirable to permit an inmate access to various educational/support materials such as educational/trade materials, mental health support, and/or other types of materials that can improve a quality of life of a given inmate. However, making physical copies of such materials accessible to inmates can pose health/safety concerns and/or impart logistical difficulties, for instance, to ensure that a given inmate has access to relevant educational/support materials.

As such, examples of the present disclosure provide inmate information communication systems, as is described herein. For instance, an inmate information communication system can include wireless devices configured to permit wireless communication in the penal facility between a first subset of the wireless devices (configured as wireless management devices) and a second subset of the wireless devices (configured as wireless inmate devices).

As used herein, a "wireless inmate device" refers to a wireless device which is configured at least in terms of a user interface and/or various permissions (e.g., types of communication permitted/operational hours, etc.) for use by an inmate. As used herein, a "wireless management device" refers to a wireless device which is configured at least in term of a user interface and/or various permissions for use by a correctional officer.

Inmate and correctional officer communication is paramount to the operation and safety in a penal facility. Notably, inmate information communication systems provide an ability to communicate, resolve, and/or eliminate possible problems and issues in the penal environment and thereby enhance operation and safety in a penal facility as compared to other approaches that do not employ inmate information communication systems.

For instance, functionality of penal facility staff can be enhanced by inmate information communications systems. For example, officers can have an ability to perform other duties and yet still stay in communication with other officers and/or inmates at least by virtue of the wireless capabilities and particular functions provided by the systems herein. Moreover, systems herein provide protection and safety to officers and inmates by use of an all-call emergency feature which, when activated on a wireless management device, can notify fellow corrections officers via respective wireless management devices.

Further, system herein permit readily resolving issues by maintaining and providing an accurate recording of all communications (e.g., video, text/written communications, etc.) between wireless management devices of correctional officers and wireless inmate devices of inmates. For instance, each of the wireless inmate devices and the wireless management device can be configured to record video, audio, text, etc. In this way, both inmates and officers can be protected by virtue of having recorded video/conversations for later review. Each of a plurality of different types of communication is recorded. For example, each of the wireless inmate devices is configured to provide a log of instances of various types of communication (i.e., communication modes) and content (text, audio, and/or video) of any instances of a type of communication is recorded.

Additionally, the systems herein can be tailored for a given penal facility. For instance, the system can be tailored based on a given security level (e.g., low security, high security, etc.) of an inmate population and/or based upon aspects of a penal facility itself. Such flexibility can include varying which of a plurality of possible types of communication, as detailed herein, each of the wireless inmate devices and/or each of the wireless management device can employ in a given penal facility. For instance, in a low security level penal facility, wireless inmate devices can be permitted to initiate and/or participate in video communications, and thus may provide a correctional officer with video content useful to better assess a given situation. However, in other instances such as in medium/high security levels, text communication may be sufficient, private, and avoid otherwise avoid transmission any unnecessary extraneous information (e.g., video information). Thus, the wireless inmate device may not be permitted to initiate and/or participate in video communications, in some instances.

In any case, the systems herein can enhance an ability of inmates to communicate with corrections officers or other penal facility staff about issues and/or requests (e.g., for education content) via an electronic ticketing system provided by the wireless devices, as detailed herein. For instance, systems herein afford a solution to typical commissary issues by providing both inmates and incarceration staff an accurate representation of available balance, available items (e.g., based on a current inmate balance, items permissible for a given inmate to purchase, or both) as well as provide the inmate with banking access. In this way, an inmate can readily view and control an inmate account thereby alleviating any tension or confusion caused as a result between an actual balance of a given inmate account and a perceived (e.g., as perceived by an inmate) balance of an inmate account.

Correctional officers can be granted access to stay informed with the activities of the inmates. For instance, corrections officers can see an activity history of any actions of the inmate communication device such as a commissary purchase history, a history of any application use and duration of application use, a record of any self-help or other materials obtain electronically via the wireless inmate device, etc. Moreover, as mentioned the corrections officers and/or other penal facility staff can review a recording/transcript of any communications to and/or from a wireless inmate device.

Finally, in contrast to other approaches, such inmate information communication systems can, when authorized by a penal facility, permit "two-way" communication between inmate wireless device and a wireless management device, as detailed herein. For instance, the systems herein can permit inmates an ability to initiate communications and thereby realize true "two-way" communication, in contrast to various other approaches that permit only "one-way" communication such as use of loudspeaker by penal facility staff and/or that only permit communication between penal facility staff such as use of "walky-talkies".

Yet, systems here prohibit communication between respective wireless inmate devices and thereby mitigate any unwanted/extraneous communication between inmates to reduce tensions, decrease flow of contraband, etc. in contrast to other "open" approaches which allow communication between various inmate devices.

FIG. 1 illustrates an example of an inmate information communication system 100 consistent with the disclosure. As shown in FIG. 1, system 100 can be deployed a penal facility 102 and can include a plurality of wireless devices 103. The wireless devices 103 can be enclosed in a corrections grade enclosure. Examples of suitable wireless devices enclosed in a corrections grade enclosures include those described in U.S. Pat. No. 10,082,835, the entire contents of which is incorporated by reference.

In some examples, each inmate, each correctional officer, or both, in the penal facility 102 have a respective wireless device. For instance, a first subset of the wireless devices 103 can be configured as a wireless management devices 105-1, 105-2, ..., 105-3 (referred to collectively as wireless management devices 105) and can be assigned to correctional officers, whereas a second sub-set of the wireless devices 103 can be configured as wireless inmate devices 104-1, 104-2, 104-3, 104-4, 104-5, 104-6, 104-7, 104-8, 104-9, 104-10, 104-11, ..., 104-12 (referred to collectively as wireless inmate devices 104) and can be assigned to inmates.

Figure 2:
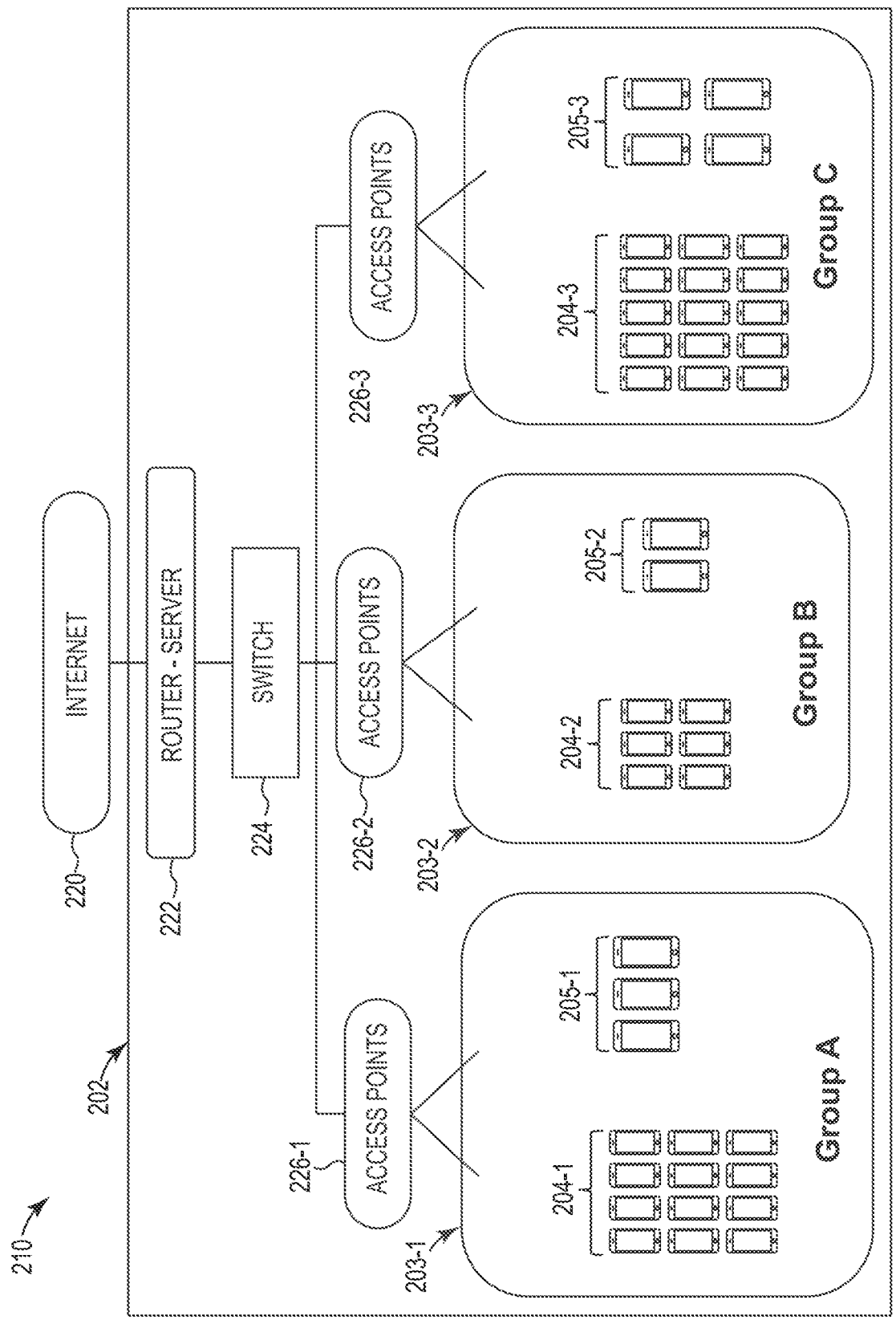
FIG. 2 illustrates another example of an inmate information communication system consistent with the disclosure.

A given quantity of the wireless devices 103, the wireless inmate devices 104, and/or the wireless management devices 10-5 can be increased or decreased from the quantities illustrated in the system 100 of FIG. 1. The system 100 can include additional components such as a switch (e.g., as switch 224 as illustrated in FIG. 2), a server (e.g., a server 222 as illustrated in FIG. 2), and/or can be coupled to the internet (e.g., internet 220 as illustrated in FIG. 2).

Wireless devices 103 represent electronic devices that can generate and/or receive electronic data and/or facilitate communication via Wi-Fi radio, among other capabilities. Examples of wireless devices 103 can include those with a capability to wirelessly communicate data, such as text messages, video call, voice call, in-application communications, etc., via a Wi-Fi radio. Each wireless device 103 can include a Wi-Fi radio. As used herein, the term "Wi-Fi radio" can, for example, refer to a radio including an antenna capable of transmitting and/or receiving data according to the Institute of Electrical and Electronics Engineers (IEEE) 802.11 standard. As used herein, the term "antenna" can, for example, refer to a device that converts electric power into radio waves, and/or vice versa.

Each of the wireless devices 103 is the same type of wireless device. For instance, the wireless devices 103 can be identical (e.g., having identical types of hardware) and/or identical base configurations (a configuration prior to be configured to a wireless inmate device or a wireless management device). Having the wireless devices 103 be the same can readily permit any of the wireless devices 103 to be configured from the base configuration to either of a wireless management device or a wireless inmate device depending on a given need of a penal facility. As needs of a penal facility can vary, each of the wireless devices can be configured from a base configuration to be a wireless inmate/management device and can subsequently be reconfigured back to the base configuration or the other of the wireless inmate/management device depending on a given need of a penal facility. A supplier of the wireless device and/or a penal staff such can cause a wireless device (e.g., by locally by entering a password into the wireless device or remotely via the internet/local area network) to be configured in a base configuration. When in a base configuration a user interface of a wireless device can present selectable icons representative of configuring the wireless device as either a wireless inmate device or a wireless management device, among other possible ways to permit the wireless device to be selectively configured. In this way, the wireless devices 103 can act a fungible wireless device 103 to account for any variance in needs of a penal facility such as those associated with any damage to one or more of the wireless devices 103, a given charging status of one or more of the wireless devices 103, and/or a change in a quantity of correctional officers and/or inmates at the penal facility.

The wireless management devices and wireless inmate devices can have different user interfaces and/or different functions. For example, wireless management devices can have user interfaces and capabilities suitable for use by correctional officers of the penal facility 102 whereas wireless inmate devices have a user interface and capabilities suitable for use by inmates of the penal facility 102. In this way, the wireless devices 103 user interfaces and capacities can be tailored to promote aspects of staff or inmate use, and yet can readily permit communication between the staff and inmates.

As mentioned, a wireless device 103 can be configured as a wireless inmate device 104 or a wireless management device 105 by a manufacturer and/or a supplier of the wireless device 103. For instance, a supplier of the wireless device 103 can use a designated factory/supplier PIN, password, or other access methodology to cause a respective wireless device 103 to enter a mode (e.g., a programming/base mode) in which a respective wireless device 103 can be reconfigured from a base operating mode as either a wireless inmate device 104 or a wireless management device 105. However, in some examples, staff of the penal facility can configure a respective wireless device 103 as a wireless inmate device 104 or a wireless management device 105.

Wireless devices 103, such as a wireless inmate device 104 or a wireless management device 105, can display a keyboard on a user interface of the wireless device. For example, a wireless device 103 can display a QWERTY keyboard such that a user of wireless device 103 can input text or other inputs to the wireless device 103. As used herein, a QWERTY keyboard refers to a keyboard layout in which the first six keys of the top left letter row are QWERTY. Although wireless devices 103 are described as displaying a QWERTY keyboard, examples of the disclosure are not so limited.

Each of the wireless devices 103 has a respective access code to initiate operation of the wireless device. For instance, each wireless inmate device of the wireless inmate devices 105 can have different respective access codes. As such, a given inmate can only utilize a particular wireless inmate device that is assigned to the inmate (e.g., which the inmate is notified of the respective access code) and thus the wireless inmate device can be configured for the given inmate. For example, the wireless inmate device can be configured to display via a user interface of a particular wireless inmate device a list of customers, correctional officers, or both, the given inmate can communicate with.

In some examples, responsive to a wireless inmate device requesting to communicate with a given wireless management device a notification can be provided to the given wireless management device. For example, a prompt can be displayed on a screen of a given wireless management device an initial time or for each time a given wireless inmate device requests communication with the given wireless managed device. In this way, a given type of communication (e.g., text, voice call, email, etc.) can be authorized between each of the wireless inmate devices and the wireless management devices on an individualized basis. Such approaches can be particularly useful in low security incarceration facilities. For instance, once authorized a given type of communication (e.g., text communication) can be permitted in the absence of a revocation of authorization. A revocation of authorization of some or all communication type authorizations of a given wireless inmate device can be issued at any point by any one of the wireless management devices or otherwise. In some instance, a penal facility wide revocation of authorization of some or all communication type authorizations of a given wireless inmate device can be issued.

Each of the wireless management devices 105 can have different respective access codes or, in some instances, can employ a common respective access code. For instance, in low security penal facilities the wireless management devices 105 can employ a common (e.g., the same) access code. Employing such common access codes can permit staff/correctional officers to readily utilizing any one of the wireless management devices depending on proximity and/or a condition (e.g., battery charge level, any degree of physical damage, etc.) of a given wireless management device. In such situations, once unlocked with the common access code a staff member of a penal facility can sign-in to a respective device to permit content specific to the staff member to be displayed. Conversely, in medium security or high security penal facilities the wireless management devices 105 can have a different respective access codes. Employing different respective access codes can provide an enhanced degree of security and/or permit individualized content (e.g., a list of respective staff and/or respective inmates that a given wireless management device can communicate with) to be provided to the given wireless management devices 105.

In some examples, the wireless devices 103 do not include a cellular radio. Stated differently, each of the wireless devices 103 does not include a cellular radio. As used herein, the term "cellular radio" can, for example, refer to a radio including an antenna capable of transmitting and/or receiving data according to standards for cellular networks, such as Global System for Mobile Communications (GSM) standards and/or Code division multiple access (CDMA) standards, among other standards for cellular networks. For example, wireless inmate devices 104 do not include a cellular radio and as such, are not able to communicate on GSM or CDMA cellular networks, among other types of cellular networks. The lack of a cellular radio may be desirable to prohibit an inmate from making a telephone call and/or sending text messages via a GSM and/or CDMA cellular network.

Wireless inmate devices 104 can communicate via the Internet, in some instances. For instance, each wireless inmate device 104 can communicate (e.g., voice call, text message, email, etc.) via the Wi-Fi radio of the wireless inmate device 104. For instance, the wireless inmate devices can communicate in accordance with the IEEE 802.11 standard.

The system 100 can include an access point 126. As used herein, the term "access point (AP)", can, for example, refer to a networking device that allows an electronic device to connect to a wired or wireless network. An AP can include a processor, memory, and input/output interfaces, including wired network interfaces such as IEEE 802.3 Ethernet interfaces, as well as wireless network interfaces such as IEEE 802.11 wireless interfaces, although examples of the disclosure are not limited to such interfaces. An AP can include memory, including read-write memory, and a hierarch of persistent memory such as ROM, EPROM, and Flash memory.

In some examples, communication between the various wireless devices of the wireless devices 103 can occur via a wireless local area network including the access point 126. As used herein, the term "wireless local area network" (WLAN) can, for example, refer to a communications network that links two or more devices using some wireless distribution method (for example, spread-spectrum or orthogonal frequency-division multiplexing radio), and usually providing a connection through an access point to the Internet or other entity; and thus, providing users with the mobility to move around within a local coverage area and still stay connected to the network.

For instance, the access point 126 can be included in a plurality of access points in a local area network in the penal facility 102 to permit communication between various ones of the wireless devices 103. Such communications can employ a local server in conjunction with access points and/or other equipment which is local to a given penal facility 102 and permit communications within the penal facility. Such arrangements can provide added security and/or data protection as compared to other approaches that rely on "cloud" or other architectures in which signals/data are transported via the internet or otherwise outside of the penal facility 102. However, the disclosure is not so limited. Rather, in some instances inmate information communication systems can include communications provided via the internet such as is described in conjunction with FIG. 2.

FIG. 2 illustrates another example of an inmate information communication system 210 consistent with the disclosure. The system 210 can be similar to the system 100 of FIG. 1. For instance, the system 210 can include wireless devices 203, access points 226, and a penal facility that are analogous or similar to wireless devices 103, access points 226, and the penal facility 102 in FIG. 1.

In some examples, subsets of the wireless inmate devices 204 and the wireless management device 205 can be included in respective communication groups in a given penal facility 202. For instance, as illustrated in FIG. 2, the wireless devices 203 can be included in a total of three respective communication group including a first communication group ("Group A") of wireless devices 203-1, a second communication group ("Group B") of wireless devices 203-2, and a third communication group (Group "C") of wireless device 203-3, etc.). Inclusion of the wireless devices 203 into respective groups can provide an enhanced degree of control over communications within the penal facility 202. For instance, communications initiated by a wireless inmate device in Group A can be limited to the wireless management devices in Group A. Thus, a wireless inmate device in Group A may, at least when permissible, communicate with wireless management devices 205-1 in Group A but cannot communicate with wireless management devices in other groups (e.g., Group B and Group C).

In some examples, a corrections officer can log (via a PIN or otherwise) into a wireless device and indicate (via a drop down menu or otherwise) in a user interface of a wireless device which portion (e.g., physical section and/or security level) of a penal facility the corrections office is working in on a given day/shift. Subsequent to logging in and specifying the portion of the penal facility, the wireless device can be configured to a wireless management device can display/provide content specific to the penal facility/portion of the penal facility. For example, the wireless management device can display a list of inmates and/or wireless inmate devices in the specific portion and/or communication group of the penal facility, but not display other inmates and/or other wireless inmate devices located in a different portion and/or communication groups of the penal facility. Such display of some but not at inmates and/or wireless inmate devices can promote efficient management of a penal facility for instance by prohibiting any extraneous/unnecessary communication between an inmate with a wireless inmate device at a first portion of a penal facility and a correctional officer with a wireless management device at a second portion (different portion) of the penal facility.

Permissions for a given wireless management device can be assigned by officer status and/or location. In some examples, wireless management devices can be assigned to a given incarceration facility (or area in an incarceration facility) and multiple shifts of correction officers can utilize the same device within the given incarceration facility (e.g., in the same area in the incarceration facility). Yet, as mentioned wireless management devices can in some examples be assigned to specific officers. For instance, correctional officers can log into device for their shift and the permissions can follow the log in for each officer. Some wireless management devices are configured such that the wireless management devices are not specific to particular corrections officers but to the officers account in the system that is authenticated with the PIN number. Devices take the role/permissions assigned to the officers when the corrections officer logs in with an account number and/or pin number. Assigned permissions control the communication paths that are allowed for each inmate with respect to customers and correctional staff. Similarly, in some examples, communications paths can control which inmates a given corrections officer can communication with. In this way, communication paths can define who can talk to whom and by what communications methods.

A wireless management device 205 can communicate with any one or more of the other wireless management devices 205. For instance, a wireless management device included in the first subset of wireless management device 205-1 can communicate with other wireless management devices in the first subset of wireless management devices in Group A and also can communicate with wireless management devices in other groups (e.g., a second subset of wireless management devices 205-2 in Group B and a third subset of wireless management devices 205-3 in Group C).

A wireless management device in a given group (e.g., Group A) can communicate substantially concurrently with all other wireless management devices. For example, each of the wireless management devices 205 can be configured to substantially concurrently communicate an emergency message exclusively to each of the other wireless management devices. As used herein, the term "substantially" means that the characteristic need not be absolute, but is close enough so as to achieve the advantages of the characteristic. For example, "substantially concurrently" is not limited to operations that are performed absolutely concurrently and can include timings that are intended to be concurrent but due to manufacturing limitations, network architectures, etc. may not be precisely concurrently. For example, due to signal delays that may be exhibited by various interfaces and/or network conditions signals that are employed "substantially concurrently" may not start or finish at exactly the same time. The emergency message can be timely and effectively communicated to all wireless management devices. Thus, correctional officers with wireless management devices in receipt of the emergency message can timely assist and respond to a variety of situations that may arise in the penal facility context. Such emergency messages are not communicated to any of the wireless inmate devices.

Figure 3:
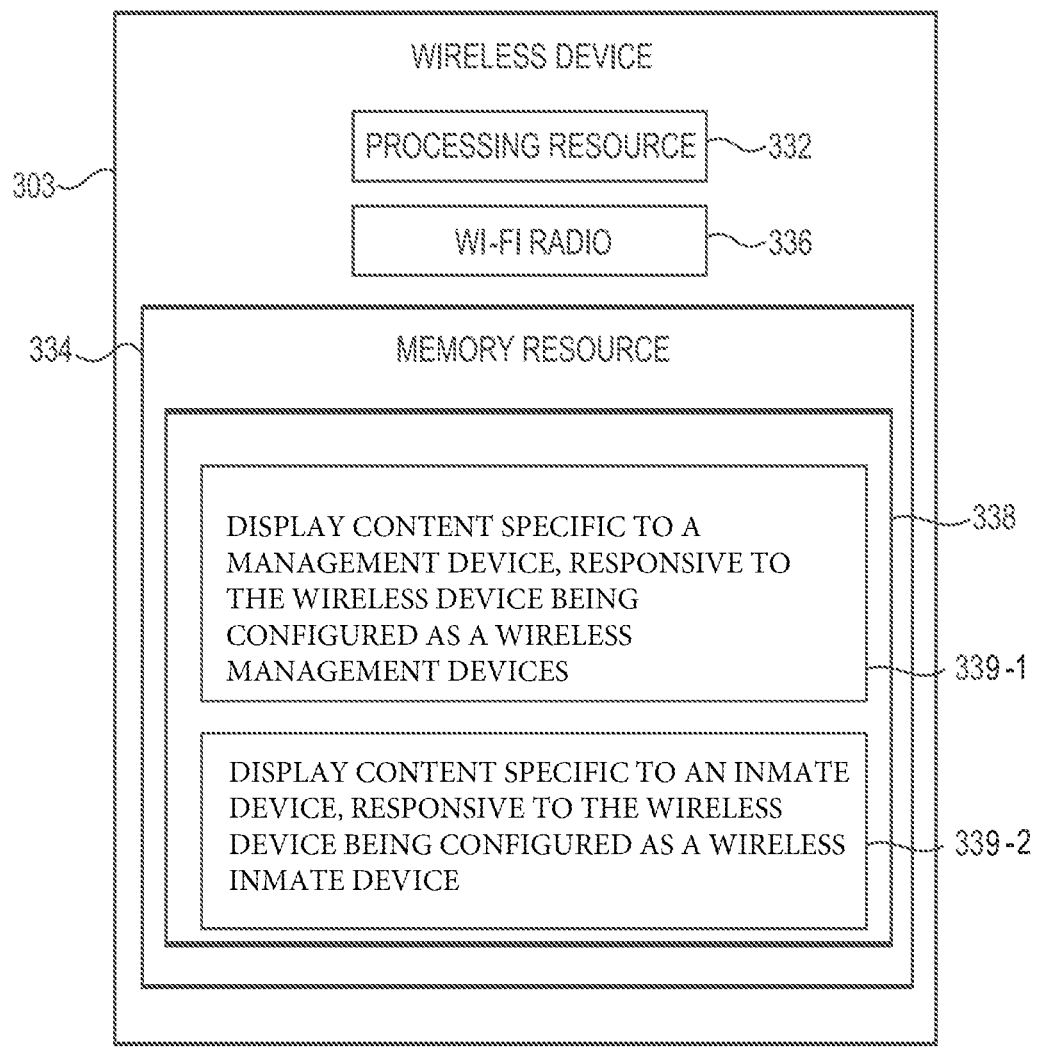
FIG. 3 illustrates a diagram of an example of a wireless device suitable for inmate information communication systems consistent with the disclosure.

FIG. 3 illustrates a diagram of an example of a wireless device 303 suitable for inmate information communication systems consistent with the disclosure. Wireless device 303 can include a processing resource 332, a memory resource 334, and a Wi-Fi radio 336. Memory resource 334 can include machine-readable instructions, including communicate a text message via a Wi-Fi radio instructions 338.

Processing resource 332 may be a central processing unit (CPU), a semiconductor based microprocessor, and/or other hardware devices suitable for retrieval and execution of machine-readable instructions 338 stored in a memory resource 334. Processing resource 332 may fetch, decode, and execute instructions 338. As an alternative or in addition to retrieving and executing instructions 338, processing resource 332 may include a plurality of electronic circuits that include electronic components for performing the functionality of instructions 338.

Memory resource 334 may be any electronic, magnetic, optical, or other physical storage device that stores executable instructions 338 and/or data. Thus, memory resource 334 may be, for example, Random Access Memory (RAM), an Electrically-Erasable Programmable Read-Only Memory (EEPROM), a storage drive, an optical disc, and the like. Memory resource 334 may be disposed within a wireless device 303, as shown in FIG. 3. Additionally and/or alternatively, memory resource 334 may be a portable, external or remote storage medium, for example, that allows wireless device 303 to download the instructions 338 from the portable/external/remote storage medium.

Memory resource 334 can be a non-transitory machine-readable medium. A machine readable storage medium may be any electronic, magnetic, optical, or other physical storage device that stores executable instructions. Thus, machine readable storage medium may be, for example, Random Access Memory (RAM), an Electrically-Erasable Programmable Read-Only Memory (EEPROM), a storage drive, an optical disc, and the like. The executable instructions may be "installed" on the wireless device 303 illustrated in FIG. 3. The machine readable storage medium may be a portable, external or remote storage medium, for example, that allows the wireless device 303 to download the instructions from the portable/external/remote storage medium. In this situation, the executable instructions may be part of an "installation package". As described herein, the machine readable storage medium may be encoded with executable instructions related to inmate text communication. That is, using processing resource 332, the machine readable storage medium may instruct a first wireless device configured as a wireless inmate device or a wireless management device to communicate with a second wireless device configured as a wireless management device via Wi-fi radio 336 and a corresponding Wi-fi radio included in the second wireless device, among other operations The instruction 338 can include instructions 339-1 to cause display, via the graphical user interface, of content specific to a management device, responsive to the wireless device being configured as a wireless management device, as detailed herein. The instructions 338 can include instructions 339-2 to cause display, via the graphical user interface, of content specific to a wireless inmate device, responsive to the wireless device being configured as a wireless inmate device, as detailed herein.

Figure 4:
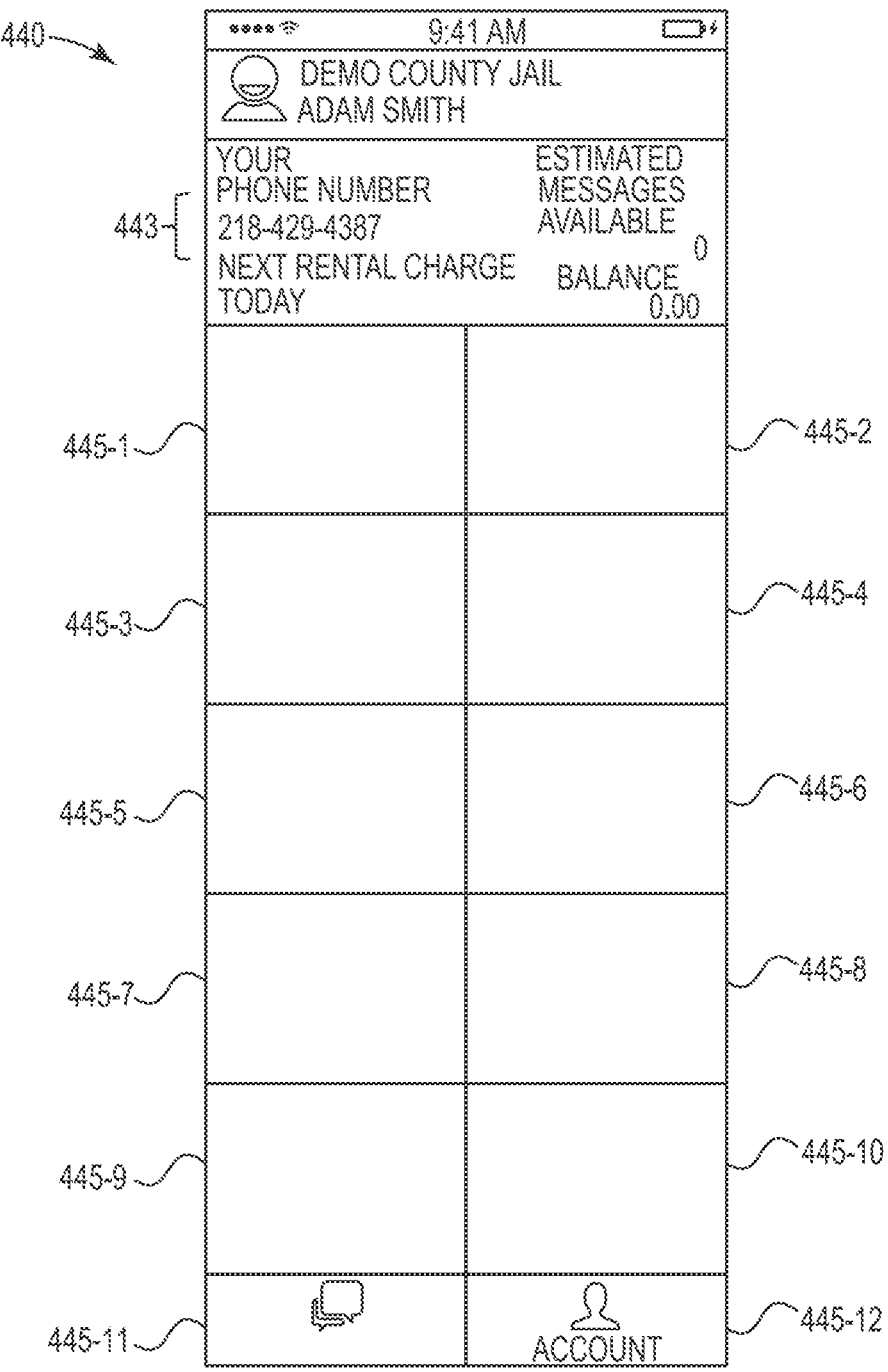
FIG. 4 illustrates an example of a user interface of a wireless device consistent with the disclosure.

FIG. 4 illustrates an example of a display of a user interface 440 of a wireless device consistent with the disclosure. The user interface 440 can display content specific to a wireless management device or content specific to a wireless inmate device. For instance, the user interface 440 can display content specific to a wireless management device, responsive to the wireless device being configured as a wireless management devices. Alternatively, the user interface 440 can display content specific to a wireless management device response to the wireless device being configure as a wireless management device.

For instance, as illustrated in FIG. 4 (and FIG. 5A) the user interface 440 can display content specific to a wireless inmate device. The user interface 440 can display an inmate name "Adam Smith" assigned a wireless inmate device and a predetermined and unique telephone number 443 that is "218-429-4387" that is assigned to a Wi-Fi radio of the wireless inmate device, among other information such as an email or other contact information of the inmate. Each of the wireless devices configured as a wireless inmate device and/or each of those configured as wireless management devices can be assigned a predetermined and unique telephone number.

The content specific to a wireless inmate device can include icons 445-1, 445-2, 445-3, 445-4, 445-5, 445-6, 445-7, 445-8, 445-9, 445-10, 445-11, . . . , 445-12 (collectively referred to herein as icons 445), text, and/or other information representative of content specific to the wireless inmate device. Each of the icons 445 can provide different functions and/or access to different application. For instance, while illustrated principally as "blank" boxes for ease of illustration, each icon may include different respective graphics, text, etc., associated with a given function and/or application.

The user interface 440 can display an icon (e.g., icon 445-11) or other information which permits an inmate to communicate with wireless management devices, customers (e.g., friends and/or family, or both. Such communications can include text, video, voice, in-application (in-app) communications, and/or other types of communications, as detailed herein.

The user interface 440 can include an icon (e.g., icon 445-12) which permits account access (e.g., including an account history such as a log of any prior communications with wireless management devices, customers, or both). Account access can also permit an inmate to load a phone card, request funds, and/or seek help (e.g., technical assistance). For example, user interface 440 can include an icon or other information to facilitate an inmate to load a phone card. For example, an inmate or a customer may purchase a telephone card. Payment information from the telephone card may be input into the wireless inmate device, for instance, by selecting a load phone card icon. The telephone card input through load phone card can fund the account associated with the wireless inmate device.

User interface 440 can include an icon or other information representative of an account history. In this way, an account history can be accessed by an inmate assigned the wireless inmate device or by penal facility staff, law enforcement, and/or legal counsel, among others. Account history can include account balance, funding transactions, messaging transactions, rental fees, credits (e.g., general credits), etc.

User interface 440 can include an icon to request funds. An account associated with the wireless inmate device may be funded by communicating a predefined funding request text message. The inmate can select request funds to cause the wireless inmate device to communicate a preprogrammed text message to direct a customer to a web site to fund the account associated with the wireless inmate device. For example, the predefined funding request text message may say "An account associated with inmate Adam Smith is out of funds. Please visit [web link] to fund the account associated with Adam Smith's wireless inmate device. Demo County Jail." As shown in FIG. 4, the user interface 440 can indicate to the inmate they have five predefined funding request text messages left to be sent for the particular time period (e.g., five predefined funding request text messages left to be sent for that day), or similarly can indicate a remaining quantity of other types of communications (e.g., remaining funding request emails, and/or remaining duration of allotted video call time and/or voice call time).

User interface 440 can include a help icon. An inmate may be able to access frequently asked questions regarding how to utilize the wireless inmate device by selecting of the help icon. In some examples, an inmate may be able to access a support chat by selecting help icon. For instance, an inmate may be able to request help in utilizing the wireless inmate device by utilizing a support chat, where the wireless inmate device communicates with a support chat via the server through an access point and wireless local area network of the penal facility. The support chat may be operated by penal facility staff or others via the server previously described in connection with FIG. 2.

User interface 440 can include an icon or other information to permit the wireless inmate device to display a plurality of electronic forms associated with departments in the penal facility. For instance, inmates can be allowed to file a complaint or a request with the correctional facility via a formed display via the user interface 440. The user interface 440 can display a forms directory for various incarceration specific forms including forms for grievances, medical requests, general requests, courts, programs, probation and others correctional communication forms for other departments at this facility. In this way, an inmate can readily use the directory to select the appropriate incarceration facility specific form and can file out and submit the form electronically via the user interface 550 to originate a given request.

For instance, the user interface 440 can include an icon or other information to permit inmates to obtain medical care such as medical care from staff of a penal facility and/or outside medical staff. For instance, the wireless inmate device can permit real-time video conferencing and/or permit an inmate access to a form to fill out various medial questions/information such that an inmate can seek a treatment plan/advice for medical issues. An inmate can utilize a wireless inmate device to initiate or otherwise perform a medical communication with a nurse, doctor or medical staff locally (e.g., a doctor located on site at an incarceration facility) or remotely. That is, with text, phone or video communications the inmate can relay information to designate medical staff. The medical staff can request additional information from inmate, contact an inmate and/or perform a medical evaluation remotely. All information is recorded with special privacy restrictions. In this way, the inmate can be provided access to medical care for diagnosis/analysis of medical problems and notably does not require the inmate to be moved in and out of secured area. Thus, the safety of the inmate and a doctor/medical professional can be maintained in contrast to other approaches that would typically require a doctor/medical professional and an inmate to be in the same physical location within the incarceration facility.

The user interface 440 can include an icon or other information to permit inmates to obtain self-help information content that is available for review. The graphical user interface shall display a list of items that can be read, watched or listened to. Items include, anger management, depression, family relationships, substance abuse, positive attitude, changing behaviors, develop a personal plan, suicidal thoughts, basic science, basic math, job seeking skills, building self-esteem, goals and a personal plan and more. Many of these services are provided to help reduce recidivism.

The user interface 440 can include an icon or other information to permit inmates to access various general corrections information such as a jail handbook, PREA information, state code, bail bondsman lists, attorney lists, administrative courts and more.

The user interface 440 can include an icon or other information to permit inmates to communicate with the ancillary services related to inmate processing. For instance, the inmates can initiate or receive requests from these other agencies related to the penal institution. Judges, attorneys, court administration, probation and other agencies can use the wireless inmate devices to remotely schedule future appointments or remotely manage the communication with inmates. The flexibility in use of text, phone and/or video can allow the other agencies to accomplish their communications remotely. The intercom system can communicate with tablets, smartphones and video equipment. Thus, the safety of the inmate and attorney/judicial staff, etc. can be maintained in contrast to other approaches that would typically require an attorney/judicial staff, etc. and an inmate to be in the same physical location within the incarceration facility.

The user interface 440 can include an icon or other information to permit inmates to order commissary items and transfer funds with their wireless inmate device. The user interface (graphical user interface) can be equipped with multiple levels of ordering and account access. For instance, each inmate can have a commissary account created when issued a wireless inmate device. The inmate can put money in their commissary account when the inmate is booked in a penal institution. The commissary account can be immediately available for funding from the wireless device providers payment web site. All inmates from the respective correctional facilities can be immediately listed on the wireless device's web site upon receiving the wireless inmate device.

Funds can be applied to a balance of an inmate account. For instance, once funded an inmate can use money from the balance of an inmate account to purchase food/other items, purchase communications minutes, texts, etc. that permit the inmate to communicate with other individuals (e.g., individuals located outside of a penal facility), among other types of items/services for purchase via the wireless device. For example, an inmate can use the wireless device to select the commissary items such as food, drinks, personal items, etc. listed on the multiple display pages. The system calculates totals and creates a billing receipt for inmate to review and digitally sign approval of the order. Funds are automatically removed for the order to be processed. The inmate can also use the wireless device (e.g., via an input to a graphical user interface of a wireless device configured as a wireless inmate device) to transfer money from the commissary account to the inmate communications account for voice, video and/or texting.

The inmate account is part of the banking software that is provided to track all inmate funds. This custom accounting package can be used in conjunction with the wireless device herein to track sources and uses of funds throughout the inmates stay at the facility. The correctional facility has complete access to this system based on permissions granted to each correctional officer. This system is equipped with several reports and is fully auditable. The system has a complete historical tracking built in to assure proper handling of inmate funds. Certain funds can be released for payments for medical, dental or restitution based on rules set at the facility. Funds are returned to inmate upon release.

The initial request can create and open ticket to allow tracking of all correspondence related to the original request. The ticket can be assigned to any one or more of multiple parties for review and processing. All responses or reviews can be logged in a ticket database with a time stamp and related information such as a given inmate and/or given wireless inmate device initiating the request. Authorized parties can review and add notes to the open ticket based on their permissions levels for each open ticket. Accessibility to each ticket can be based on permission level and/or a job title. For instance, a respective inmate can view an open ticket and correctional officers/correctional officers can view an open ticket. In some instances, some but not all correctional officers/correction officers can view an open ticket. For instance, correctional officers assigned a wireless management device in a given communication group (e.g., Group A) including a wireless inmate device which originated a ticket can be permitted to view a ticket, while other correctional officers assigned wireless management devices in a different communication group (e.g., Group B) are not permitted to view the ticket and/or not permitted to view content included in the ticket. The penal facility can respond to the ticket. In some examples, an inmate can be permitted to follow-up (e.g., ask questions or make additional comments) on a ticket that has been responded to by the penal facility. The process continues until the issues are resolved and the ticket is closed.

Figure 5A:
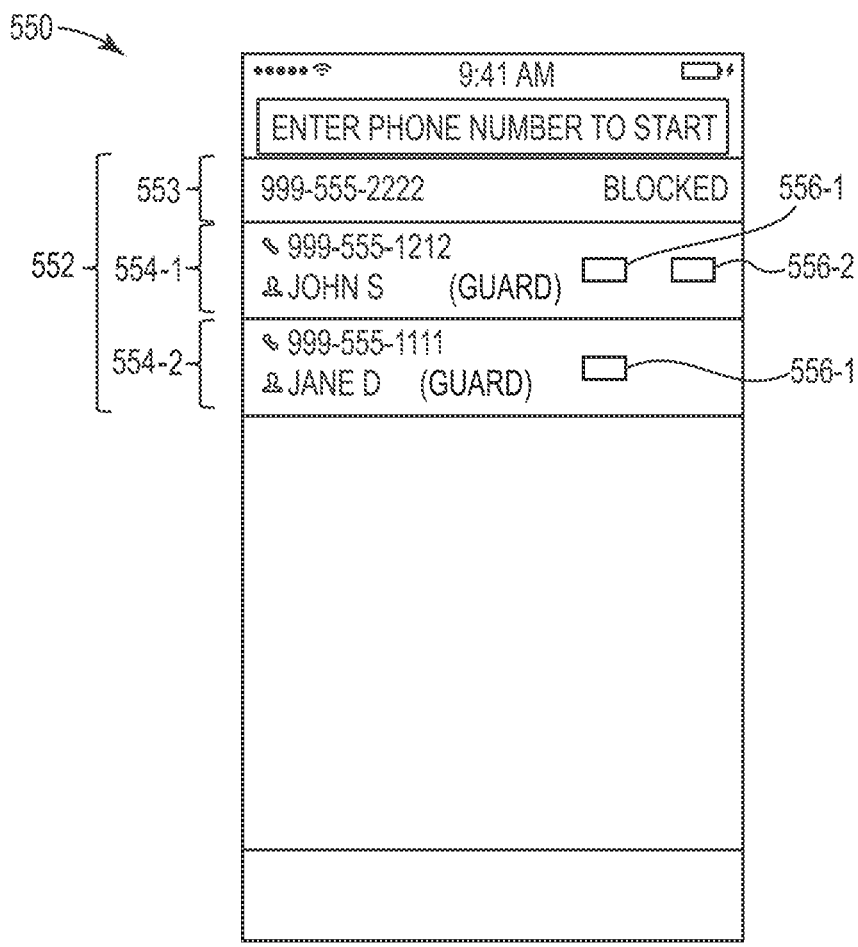
FIG. 5A illustrates an example of a user interface of a wireless inmate device consistent with the disclosure.

FIG. 5A illustrates an example of a user interface 550 of a wireless inmate device consistent with the disclosure. Wireless inmate devices can display content specific to wireless inmate devices generally, content specific to an inmate assigned the wireless inmate device, or both. For instance, a wireless inmate device assigned to and accessible only by a respective inmate can be configured for the respective inmate (e.g., display a name, list of contacts, types of permitted communications, any open tickets/grievances, account information, etc. that is specific to the respective inmate).

For instance, the wireless inmate device can be configured to display a list of contacts 552 that is specific to the wireless inmate device. The list of contacts 552 can include a list of customers (e.g., a first customer 553), a list of correctional officers (e.g., a first correctional officer 554-1 and a second correctional officer 554-2), or both. Notably, the list of contacts 552 that is specific to the wireless inmate device does not include any other wireless inmate devices.

An inmate can select a contact (e.g., a listed customer or correctional officer) from the list of contacts 552 and subsequently communicate with the selected contact. That is, an inmate can, in some examples, initiate a communication (e.g., of a type of communication permitted and displayed in the user interface 550) with a customer or a correctional officer (or other staff of a penal institution). However, at least by virtue of not displaying any other wireless inmate devices in the list of contacts 552, the inmate is prohibited from initiating or otherwise communicating with another inmate that has another wireless inmate device. The inmate, in some instances, is only permitted to communicate with contacts included in the list of contacts. In such instances, any changes to the list of contacts can be permitted by or approved by an officer.

The user interface 550 can display only a portion of a name (e.g., a first name), an alias, or other limited identifying information (e.g., rather than conveying a full first name and/or full last name) for instance, to maintain a degree of anonymity with respect to penal staff. For instance, as illustrated in FIG. 5A only a first name and last name initial is communicated via the user interface 550 to an inmate, among other possibilities.

The list of contacts 552 can include some but not all correctional officers in a penal facility. For instance, the list of contacts 552 can only include customers and/or correctional officers with which the particular wireless inmate device (and thus the particular inmate assigned the wireless inmate device) is permitted to have at least one type of communication with. Thus, the inmate can only be provided with information which is relevant to the respective inmate and thereby not provide the inmate with any additional information which may be improperly used by the inmate.

As illustrated in FIG. 5A, the list of contacts 552 can include a list of correctional officers including the first correctional officer 554-1 and the second correctional officer 554-2. Notably, different types of communications can be permitted with different correctional officers. For instance, the wireless inmate device with the user interface 550 may be permitted to communicate via a first type of communication (e.g., text communication) and a second type of communication (e.g., a voice call) with the first correctional officer 554-1 and yet may be permitted only the first type of communication with the second correctional officer 554-2.

A correctional officer, other staff member in a penal facility, and/or a managing entity such as a supplier of the wireless devices can configure which types of communications are permitted by a wireless inmate device with respect to a given contact such as a given customer and/or a given correctional officer.

Thus, system herein can tailor inmate communications capabilities to a given penal facility (e.g., low security), to groups in the given penal facility, and/or even specific inmates within a given penal facility, and thereby provide enhanced controller over inmate communications in contrast to other approaches that do not employ inmate information communications systems, as described herein. For instance, inmates can be permitted an opportunity to realize at least some degree of communication with customers and/or penal facility staff. Yet, the ability to tailor inmate communications herein on an individual wireless inmate device level provides penal facility staff an ability to reward or discourage inmates for various behaviors that is not afforded by other approaches such as those which use communal communication devices (e.g., which are tethered to a wall and/or not assigned to a given inmate).

Moreover, inmate information communication systems herein can provide additional capabilities to an inmate not afforded by other approaches such as those which employ a communal communication device. For instance, the inmate can block a given customer contact even though the inmate is not permitted to block communication for a correctional officer or other penal facility staff. In this way, the wireless inmate device is blocked from communicating with the blocked device/number. For example, an inmate can block certain mobile devices from communicating text messages, phone call, etc. with the wireless inmate device. For instance, as shown in FIG. 5A, user interface 550 indicates that a blocked contact 553 has been blocked by the inmate from communicating with the inmate. By blocking a mobile device, the inmate has effectively prevented the mobile device with associated telephone number "999-555-2222" from communicating (e.g., communicating text messages) with the wireless inmate device assigned to the inmate. Thus, communications such text messages sent from the blocked mobile device can be saved in a server (e.g., for review), but may not be received by the wireless inmate device and accordingly, not incur a monetary cost for the inmate.

Figure 5B:
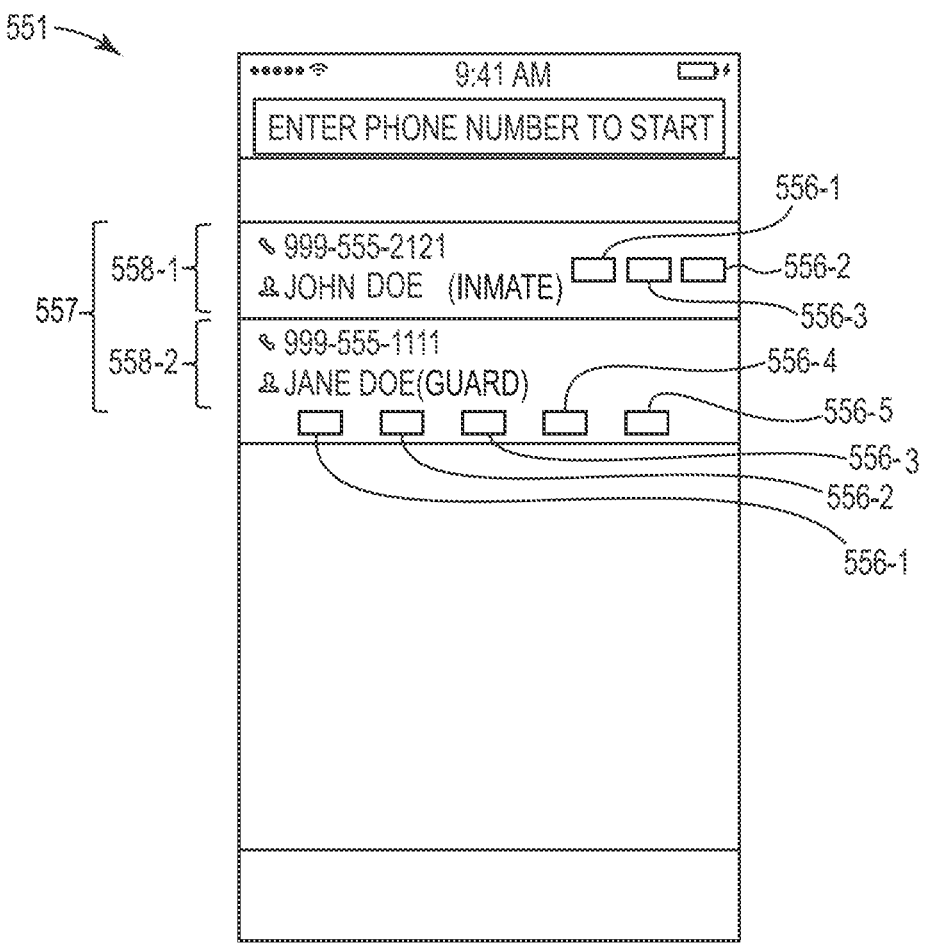
FIG. 5B illustrates an example of a user interface of a wireless management device for consistent with the disclosure.

FIG. 5B illustrates an example of a user interface 551 of a wireless management device consistent with the disclosure. As illustrated in FIG. 5B, the user interface 551 can include a list of contacts 557 that is specific to the wireless management device. The list of contacts 557 that is specific to the wireless management device is different than the list of contacts (e.g., the list of contacts 552 as described in FIG. 5A) that is specific to the wireless inmate device. For instance, as mentioned the list of contacts that is specific to the wireless inmate device does not include any wireless inmate devices (e.g., does not include any identifying information or indication of the presence of any other wireless inmate devices in a given incarceration facility).

Conversely, the list of contacts 557 that is specific to the wireless management device includes at least one wireless inmate device. For instance, as illustrated in FIG. 5B the list of contacts 557 includes a representation and identifying information of a wireless inmate device assigned to John Doe. Generally, the list of contacts 557 can include a plurality of wireless inmate devices.

The user interface 551 can display identifying information for each respective wireless inmate device included in the list of contacts 557 such as respective inmate name (e.g., John Doe), housing information (e.g., wing #, cell #), a group #, and/or a telephone number of the inmate assigned to a respective wireless inmate device. The user interface 551 can display any types of communications permitted between the wireless management device and each respective wireless inmate devices included in the list of contact 555, among other information. For instance, the user interface 551 can display information indicating that the wireless inmate device assigned to John Doe can be permitted to initiate and/or participate in a first communication type 556-1 (e.g., text messaging), a second communication type 556-2 (e.g., a voice call), and a third communication type (e.g., email) with the wireless management device having the user interface 551.

As illustrated in FIG. 5B the communication types in the list of contacts 557 can include a first communication type 556-1 (e.g., a text messaging), a second communication type 556-2 (e.g., a voice call), and a third communication type (e.g., an email) that may also be available to wireless inmate devices. However, the communication types in the list of contacts 557 can also communication types which are not available to a wireless inmate device. For instance, the list of contacts 557 can include a fourth type of communication (e.g., an intercom), and/or a fifth type of communication (e.g., an emergency alarm) that are not available to any of the wireless inmate devices. The intercom function can permit a correctional officer or other penal staff to speak directly to an inmate associated with a wireless communication device. The intercom function can be one-way and permit the correctional officer to other penal staff to speak (e.g., while/after depressing an intercom icon) to a wireless management device and have such speech immediately emitted from a speaker in a selected wireless inmate device. As mentioned, the emergency alarm type of communication can permit an emergency message to be communicated exclusively to each of a plurality of wireless management devices.

A correctional officer or other staff of a penal institution can select a contact (e.g., a listed inmate or a listed correctional officer) from the list of contacts 557 and subsequently initiate and communicate with the selected contact. Stated differently, the wireless management device can be configured to permit wireless communication with at least some of the first subset (the wireless management devices) and can permit wireless communication with at least some of the second subset (the wireless inmate devices).

For instance, the second subset configured as wireless inmate devices can be configured to initiate a wireless communication with some (e.g., those in the same communication group in an incarceration facility) but not all (those in other communications groups) of the first subset configured as wireless management devices. Conversely, the second subset of the plurality of wireless devices are configured as wireless inmate devices to permit wireless communication with at least some of the first subset and prohibit any communication within the second subset (e.g., prohibit any communication with other wireless devices configured as the second subset of wireless devices. That is, each wireless inmate device is configured to prohibit communication with any of the other wireless inmate devices of the second subset.

Figure 6:
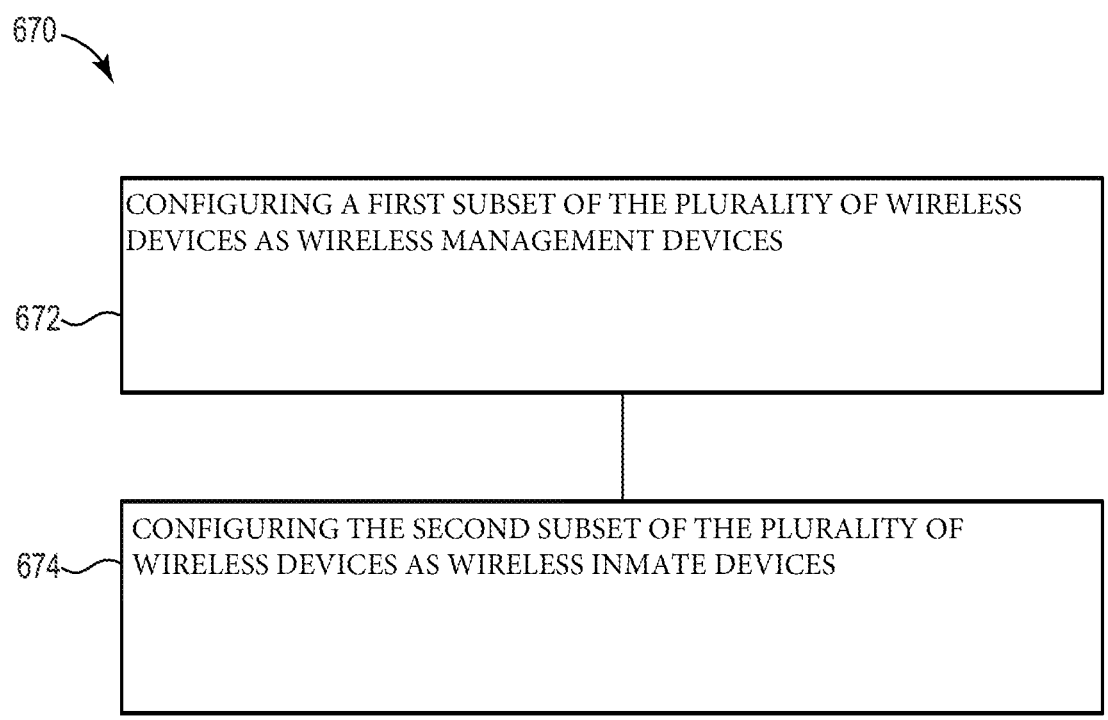
FIG. 6 illustrates an example of a method suitable for inmate information communication systems consistent with the disclosure.

FIG. 6 illustrates an example of a method 670 suitable for an inmate information communication system consistent with the disclosure. The methods described herein (e.g., with respect to FIG. 6) can be performed by processing logic that can include hardware (e.g., processing device, circuitry, dedicated logic, programmable logic, microcode, hardware of a unit, integrated circuit, etc.), software (e.g., instructions run or executed on a processing unit), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible. For example, method 670 can be performed by a wireless device configured as a wireless inmate device, a wireless device configured as a wireless management device, an access point, and/or a server.

The method 670 can include configuring a plurality of wireless devices to permit wireless communication in a penal facility between a first subset of the plurality of wireless devices and a second subset of the plurality of wireless devices, as detailed herein. For instance, the method 670 can include configuring a first subset of the plurality of wireless devices as wireless management devices, as illustrated at 672, and can include configuring the second subset of the plurality of wireless devices as wireless inmate devices, as illustrated in 674.

The first subset of the of wireless devices configured as wireless management devices can be configured to permit wireless communication with at least some of the first subset and at least some of the second subset. In contrast, the second subset of the wireless devices configured as wireless inmate devices can permit wireless communication with at least some of the first subset, and yet prohibit any communication within the second subset. For instance, each wireless inmate device can be configured to prohibit any communication with at least some (or all of) the other wireless inmate devices. In this way, any unwanted or nefarious communication between inmates can be prohibited, yet communication with at least some of the wireless management devices can be permitted.

The method 670 can include displaying, by a user interface of a wireless inmate device or a wireless management device, a keyboard. The keyboard can be a QWERTY keyboard, and may be displayed such that an inmate or correctional officer may input information via the user interface such as inputting a PIN, as described herein.

The method 670 can include providing, for instance via a an access point, a server, and/or the internet, a communication between a wireless inmate device and a customer. The customer can be located external to a penal facility in which the inmate and the wireless inmate device are included. For instance, a communication can occur between a Wi-Fi radio of the wireless inmate device and a mobile device of a customer without use of a cellular radio at least by the wireless inmate messaging device.

As used herein, "logic" is an alternative or additional processing resource to perform a particular action and/or element described herein. Logic can include hardware. The hardware can include processing resources such as circuitry, which are distinct from machine-readable instructions on a machine readable media. Further, as used herein, "a" can refer to one or more such things.

The above specification, examples and data provide a description of the method and applications, and use of the system and method of the disclosure. Since many examples can be made without departing from the spirit and scope of the system and method of the disclosure, this specification merely sets forth some of the many possible example configurations and implementations.

What is claimed is:

1. An inmate information communication system, comprising:
    a plurality of wireless devices configured to permit wireless communication within a penal facility between a first subset of the plurality of wireless devices configured as wireless management devices and a second subset of the plurality of wireless devices configured as wireless inmate devices, wherein each wireless inmate device is configured to permit wireless communication with at least some of the wireless management devices and prohibit communication with any of the other wireless inmate devices, wherein each wireless inmate device is configured for a respective inmate and is configured to display:
    a representation of at least one correctional officer that the respective inmate can communicate with; and
    a representation of at least one communication type by which the respective inmate can communicate with the at least one correctional officer, wherein the at least one communication type includes a text communication, a voice communication, a video communication, an email communication, or any combination thereof.

2. The inmate information communication system of claim 1, wherein each wireless device of the plurality of wireless devices is the same type of wireless device, each wireless device of the plurality of wireless device is a wireless device included in a hardened enclosure, or both.

3. The inmate information communication system of claim 1, wherein the wireless management devices are configured differently than the wireless inmate devices.

4. The inmate information communication system of claim 1, wherein each wireless device of the plurality of wireless devices has a respective access code to initiate operation of the wireless device, and wherein:
    each of the first subset of the plurality of wireless devices configured as wireless management devices has a common respective access code; and
    each of the second subset of the plurality of wireless devices configured as wireless inmate devices has a different respective access code.

5. The inmate information communication system of claim 1, wherein each of the plurality of communication types is recorded.

6. The inmate information communication system of claim 1, wherein each of the wireless inmate devices is configured to provide:
    a log of instances of the plurality of communication types; and
    a recording of video, audio, text content, or any combination thereof of for each of the instances of the plurality of communication types.

7. The inmate information communication system of claim 1, wherein each wireless inmate device is configured to display a plurality of electronic forms associated with departments in the penal facility.

8. The inmate information communication system of claim 1, wherein the plurality of wireless management devices are configured to substantially concurrently communicate an emergency message exclusively to each of the plurality of wireless management device responsive to any one of the plurality of wireless management device initiating the emergency message.

9. The inmate information communication system of claim 1, wherein the first subset configured as the wireless management devices can initiate wireless communication with any one or more of the second subset configured as wireless inmate devices.

10. The inmate information communication system of claim 9, wherein each wireless management device can initiate a wireless communication with another wireless management device.

11. The inmate information communication system of claim 1, wherein the second subset configured as the wireless inmate devices can initiate a wireless communication with some but not all of the first subset configured as the wireless management devices.

12. A non-transitory machine-readable medium storing instructions executable by a processing resource to:
    configure a plurality of wireless devices to permit wireless communication within a penal facility between a first subset of the plurality of wireless devices and a second subset of the plurality of wireless devices; and wherein:
    the first subset of the plurality of wireless devices are configured as wireless management devices; and
    the second subset of the plurality of wireless devices are configured as wireless inmate devices to:
    permit wireless communication with at least some of the wireless management devices; and
    prohibit any communication to another wireless inmate device, wherein each wireless inmate device is configured for a respective inmate and is configured to display:
    a representation of at least one correctional officer that the respective inmate can communicate with; and a representation of at least one communication type by which the respective inmate can communicate with the at least one correctional officer, wherein the at least one communication type includes a text communication, a voice communication, a video communication, an email communication, or any combination thereof.

13. The medium of claim 12, wherein the instructions further comprise instruction to configure the wireless management devices to:
permit wireless communication with at least some of the wireless management devices; and
permit wireless communication with at least some of the wireless inmate devices.

14. The medium of claim 12, wherein the instructions further comprise instructions to:
display, via a user interface, content specific to a wireless management device, responsive to configuration as the wireless management devices; or
display, via the user interface, content specific to a wireless inmate device, responsive to being configured as the wireless inmate device.

15. A wireless device for communication within a penal facility, the wireless device comprising:
a user interface;
a processing resource; and
a non-transitory machine-readable medium storing instructions executable by the processing resource to cause display, via the user interface, of content specific to a wireless management device, responsive to being configured as the management device, wherein the content specific to the wireless management device includes an indicator of at least one inmate associated with a wireless inmate device; and
cause display, via the user interface, of content specific to an inmate device, responsive to configuration as the wireless inmate device.

16. The wireless device of claim 15, wherein the content specific to the wireless management device includes display of an icon that permits communication of an emergency message exclusively to each of a plurality of wireless management devices.

17. An inmate information communication system, comprising:
a plurality of wireless devices configured to permit wireless communication within a penal facility between a first subset of the plurality of wireless devices configured as wireless management devices and a second subset of the plurality of wireless devices configured as wireless inmate devices, wherein the plurality of wireless management devices are configured to substantially concurrently communicate an emergency message exclusively to each of the plurality of wireless management device responsive to any one of the plurality of wireless management device initiating the emergency message.

18. A wireless device for communication within a penal facility, the wireless device comprising:
a user interface;
a processing resource; and
a non-transitory machine-readable medium storing instructions executable by the processing resource to
cause display, via the user interface, of content specific to a wireless management device, responsive to being configured as the management device, wherein the content specific to the wireless management device includes display of an icon that permits communication of an emergency message exclusively to each of a plurality of wireless management devices; and
cause display, via the user interface, of content specific to an inmate device, responsive to configuration as the wireless inmate device.

\* \* \* \* \*